United States Patent [19]

Buckley et al.

[11] Patent Number: 5,036,472

[45] Date of Patent: Jul. 30, 1991

[54] COMPUTER CONTROLLED MACHINE FOR VENDING PERSONALIZED PRODUCTS OR THE LIKE

[75] Inventors: Stephen P. Buckley, Kansas City; Richard A. Robinson, Parkville; John H. Hurlbut, Lee's Sumit; Kurt A. Pfahl, Leawood; Arthur E. Doerflinger, Kansas City, all of Mo.

[73] Assignee: Hallmark Cards, Inc., Kansas City, Mo.

[21] Appl. No.: 282,013

[22] Filed: Dec. 8, 1988

[51] Int. Cl.$^5$ .............................................. G06F 15/20

[52] U.S. Cl. ..................................... 364/479; 364/468

[58] Field of Search ............... 364/471, 478, 479, 519, 364/520, 518, 468; 221/9; 101/211; 414/793, 796

[56] References Cited

U.S. PATENT DOCUMENTS

| | | | |
|---|---|---|---|
| 4,414,896 | 11/1983 | Fischer | 101/211 |
| 4,616,327 | 10/1986 | Rosewarne et al. | 364/520 |
| 4,623,292 | 10/1986 | Suzuki et al. | 414/796 |
| 4,625,275 | 11/1986 | Smith | 364/479 |
| 4,677,565 | 6/1987 | Ogaki et al. | 364/479 |
| 4,699,532 | 10/1987 | Smith | 364/479 |
| 4,733,362 | 3/1988 | Haraguchi | 364/479 |
| 4,789,147 | 12/1988 | Berger et al. | 364/471 |
| 4,817,043 | 3/1989 | Brown | 364/518 |
| 4,873,643 | 10/1989 | Powell et al. | 364/468 |
| 4,896,791 | 1/1990 | Smith | 364/479 |
| 4,949,257 | 8/1990 | Orbach | 364/479 |
| 4,970,655 | 11/1990 | Winn et al. | 364/479 |

*Primary Examiner*—Jerry Smith
*Assistant Examiner*—Jim Trammell
*Attorney, Agent, or Firm*—Neuman, Williams, Anderson & Olson

[57] ABSTRACT

A machine for vending greeting cards or other personalized or customized products includes audio and video presentations of available products and options available to a customer, provisions for payment and apparatus for automatic delivery of products. Base products such as preprinted forms are stored for selective transfer by a robot device to modifying apparatus such as a printer, modified products being delivered to a delivery receptacle, all operations being under computer control and being changeable as desired for adding or substituting new forms of products.

28 Claims, 8 Drawing Sheets

Fig. 1
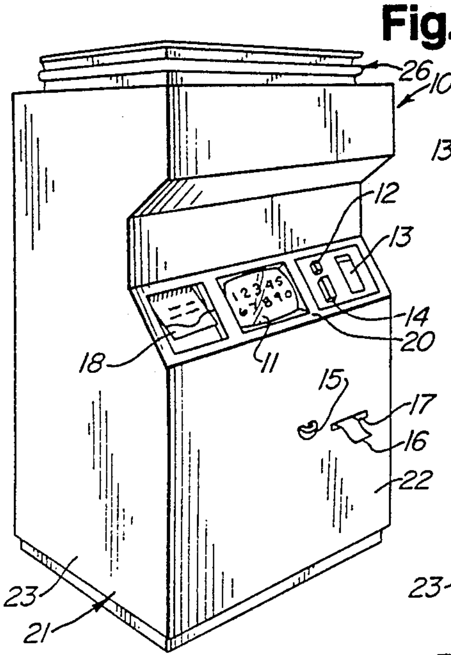
Fig. 3
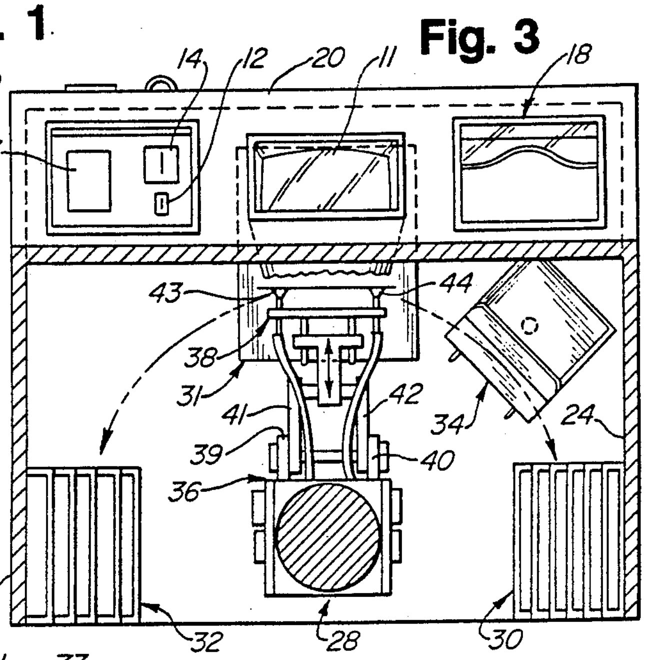
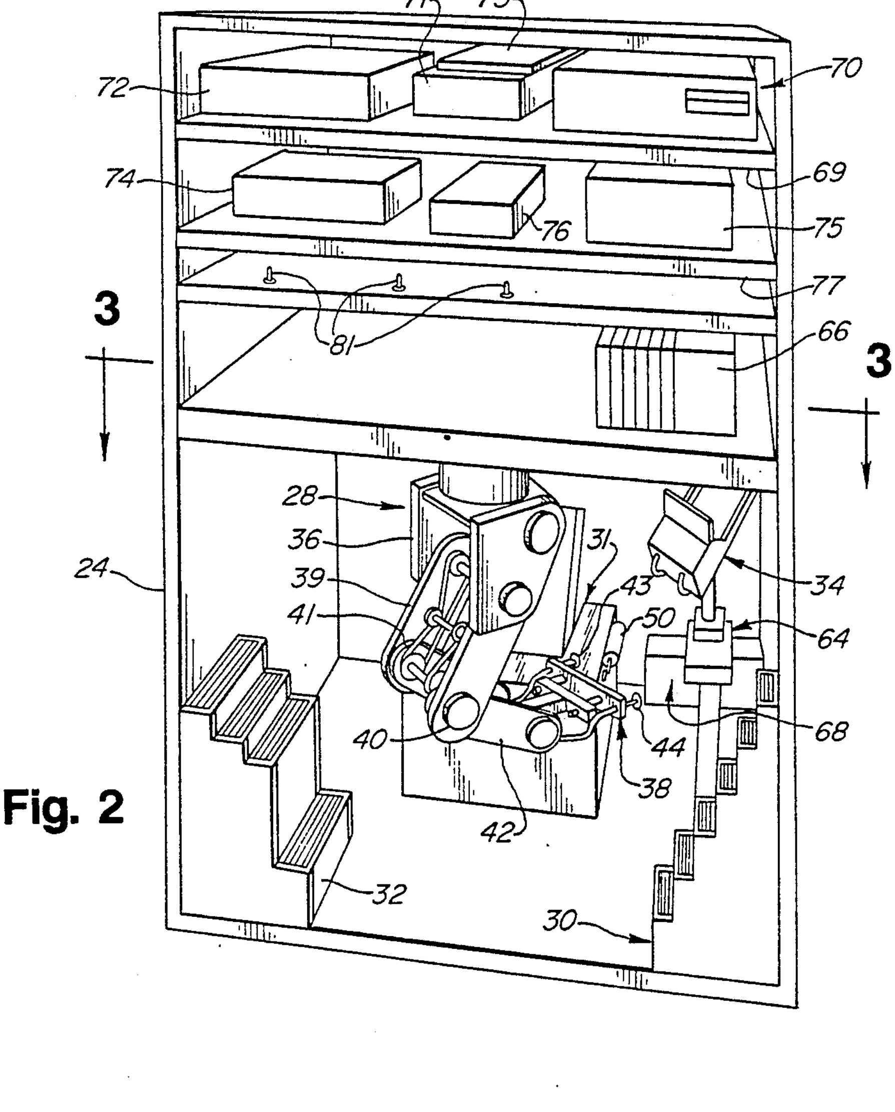
Fig. 2

Fig. 11
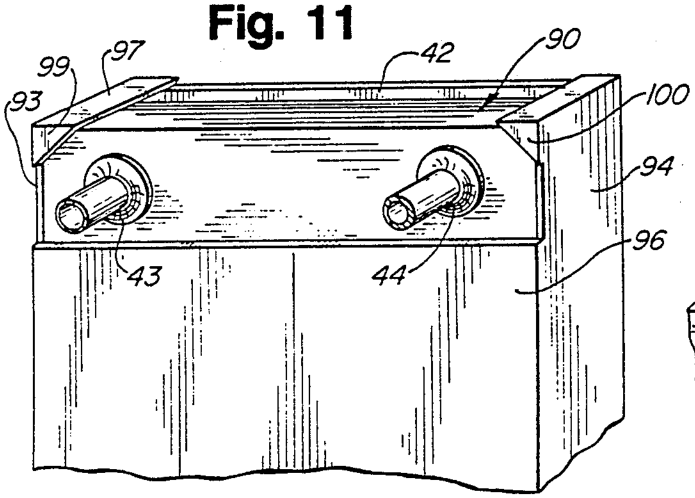
Fig. 13
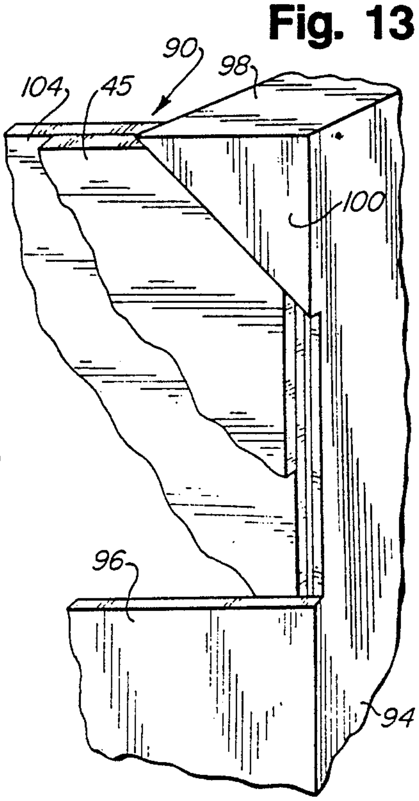
Fig. 12
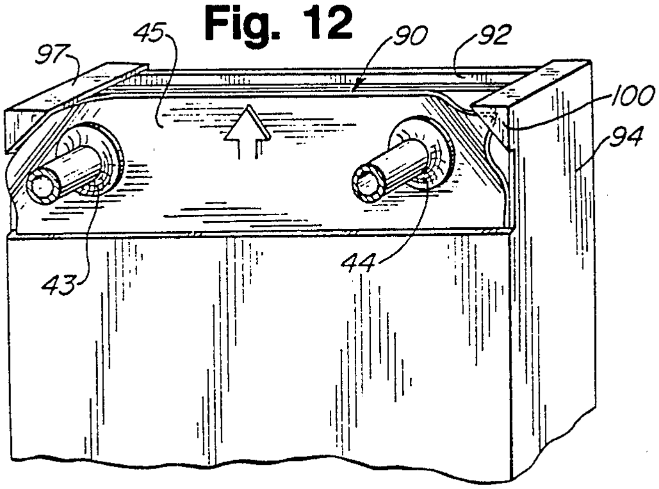
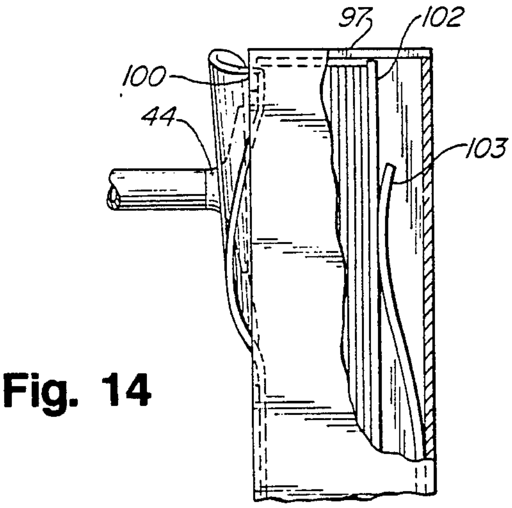
Fig. 14
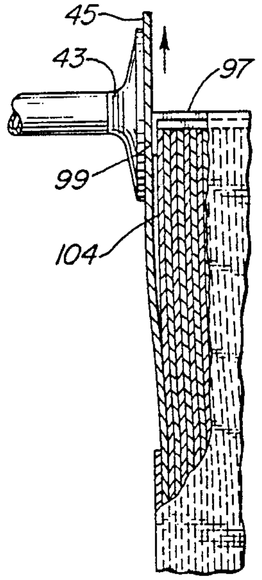
Fig. 15

COMPUTER CONTROLLED MACHINE FOR VENDING PERSONALIZED PRODUCTS OR THE LIKE

BACKGROUND OF THE INVENTION

1. Field of the Invention

This invention relates to a vending machine and more particularly to an interactive machine which dispenses greeting cards or other personalized products selected by a customer. The machine provides readily understandable information as to available products and their attributes and of the steps required for selection thereof so as to be readily operable by a customer without assistance. It is reliable, efficient and fast in operation, is usable with a variety of types of products is otherwise very versatile, and it is manufacturable at relatively low cost.

2. Background of the Prior Art

U.S. Pat. Nos. 3,892,427 and 3,982,744 disclose methods for the production of personalized "ME" books in which, for example, the name of a child who is to receive a story book is printed in the text of a story book. In the production of such books, a computer was used to control a printer to print variable data on preprinted sheet material to form sheets which were bound together in a separate operation to provide the final hard cover book product. As disclosed, many types of variable data could be stored in the computer and such variable data may include quality control indicia which may include check bars or other graphics.

The Rosewarne et al. U.S. Pat. No. 4,616,327 discloses methods similar to those disclosed in the "ME" book patents and the printing of specific types of graphics including pictorial figures having physical characteristics similar to personalized data introduced into the system. A standard microprocessor is programmed to provide storage and combining functions after personalized data is introduced into the system by temporary storage by the purchaser or user on a storage medium such as a punched card. One or more plotters are used for producing the final product, an eight pen plotter being disclosed.

Many vending machines have heretofore been provided for vending of cans, bottles, hot and cold liquids in cups, sandwiches, candy, combs, and various other products, each machine being typically designed to handle only products which have a physical size and shape within a certain limited range. Typically, a customer inserts a coin in a slot and makes a selection by pushing a button or by effecting movement of an article carrier to position a selected article at an exit position.

SUMMARY OF THE INVENTION

This invention was evolved with the general object of providing a machine for vending greeting cards and similar personalized products and which is readily operable by a customer without assistance to obtain personalized or customized products of his or her choice.

Another object of the invention is to provide a machine which is reliable, efficient and versatile while being manufacturable at relatively low cost.

A further object of the invention is to provide a machine which displays identifications o available products and desirable attributes and features thereof an of modes of selection such as to facilitate selection of product and the desired attributes and features by the customer.

Another object of the invention is to provide a flexible manufacturing platform which allows for quick changes of product storage means to allow different products to be manufactured to customer's preferences.

A still further object of the invention is to provide a "just-in-time" manufacturing platform in which products are tailored to the customer's preference at the time of purchase, one at a time.

A machine constructed in accordance with the invention includes an enclosure with selection and payment means on the outside thereof and with product storage and handling means on the inside thereof, all coupled to a computer which is on the inside of the enclosure and which is programmed to deliver a selected product to a receptacle from which it may be removed by the customer.

Preferably, available products and their desirable attributes and features are identified both audibly and visually and the computer is programmed to control presentation of a sequence of images and associated sound. In accordance with an important feature, it controls a general presentation of a series of descriptions of available products and their features with instructions as to initiating use of the machine. When a customer initiates use of the machine, the computer then controls presentations of specific instructions to the customer to make it possible to make selections easily, quickly and accurately. After a customer's selections are effected, the computer again controls the general presentation and repeats it until another customer's use is initiated. Thus the audible and visual capabilities of the machine are used to maximum advantage.

In an illustrated embodiment, the images are presented on a CRT screen which is also usable as a touch screen for selection of the desired product and the desired features and attributes thereof. The touch screen or a keyboard or other input device may be used, for example, to select from among a number of different birthday cards and to enter the name and birthdate of the intended receiver, the name of the sender and other personalized data.

After a customer selects and pays for a greeting card or other product, a data entering mode may be initiated in which he or she is asked to enter data or otherwise select the form of the final product, as by entering the names of the receiver and sender of a birthday card, for example. The data entering mode may further include operations for viewing and correction of entered data.

Important features of the current embodiment of the invention relate to the handling of a product, wherein a product is selected, transferred to modifying apparatus such as a printer and subsequently transferred therefrom to a delivery receptacle. An illustrated machine includes a robot which is so positioned relative to stored products and the printer or other modifying apparatus as to facilitate selection of a product and transfers to and from the modifying apparatus. Preferably the robot includes a turret head which is rotatable about a fixed axis with a transfer head supported from the turret head through an articulated arm assembly and with the stored products and modifying apparatus positioned in angularly spaced relation.

For transfer of products such as printed forms, envelopes and other sheet materials or the equivalent, the transfer head preferably includes suction cups. The products may preferably be compactly stored in stacks in a stepped relationship such that a portion of an end product of each stack is accessible for engagement by suction cups of the transfer head. In the alternative, electromechanically operated and slidable magazines or turrets may present products to a material handling device such as a robot.

The product handling apparatus may also include a transfer device for receiving products from the robot and transferring the products to a delivery receptacle, so arranged as to obtain a compact machine and rapid and efficient handling of the products. The transfer device is arranged in angularly spaced relation to the modifying apparatus and to the stored products. Preferably, the device is rotatable about an axis parallel to the turret axis, between an angular position for receiving products from the robot and an angular position for delivery of products to the delivery receptacle. In a preferred construction the turret axis is a vertical axis and the transfer device is movable vertically to elevate products to a position at which they can be dropped into a delivery receptacle which is conveniently located at an elevated position in relation to the robot.

Still further features relate to the control of operations such as to facilitate rapid and efficient delivery of products. For example, after a customer selects and pays for a product, the transfer of the selected product from storage to a printer or other modifying apparatus is initiated immediately and is preformed while the customer is making selections of data for printing or other modifications of the product. Also, while printing or other modifications are taking place, other required operations may take place, such as the selection of an envelope appropriate for a selected form of greeting card.

The machine of the invention is very versatile.

The machine of the invention is very versatile. It can be readily programmed and otherwise adapted for use in a wide variety of types of products, for rapid, efficient and reliable selection and delivery thereof.

The machine of the invention is additionally advantageous in that it can compile sales information covering different time periods, e.g. one day or one month, which can then be summarized and evaluated in accordance with specific requirements.

This invention contemplates other objects, features and advantages which will become more fully apparent from the following detailed description taken in conjunction with the accompanying drawings.

BRIEF DESCRIPTION OF THE DRAWINGS

FIG. 1 is a perspective view of a greeting card dispensing machine constructed in accordance with the invention;

FIG. 2 is a rear perspective view of the machine of FIG. 1, with a rear wall thereof removed;

FIG. 3 is a horizontal sectional view taken substantially along line III—III of FIG. 2 and showing a robot and associated structures within the machine;

FIG. 11 illustrates a portion of a form storage bin and suction cups used in picking up a form;

FIG. 12 is similar to FIG. 11, but illustrates the condition after moving the cups upwardly a short distance;

FIG. 13 illustrates an upper corner portion of a bin, on an enlarged scale;

FIG. 14 is a side view of a bin with a portions of a side wall broken away; and FIG. 15 is a sectional view illustrating the condition of forms after movement as shown in FIG. 12, the thicknesses of forms being exaggerated for clarity of illustration.

DESCRIPTION OF A PREFERRED EMBODIMENT

Figure 4:
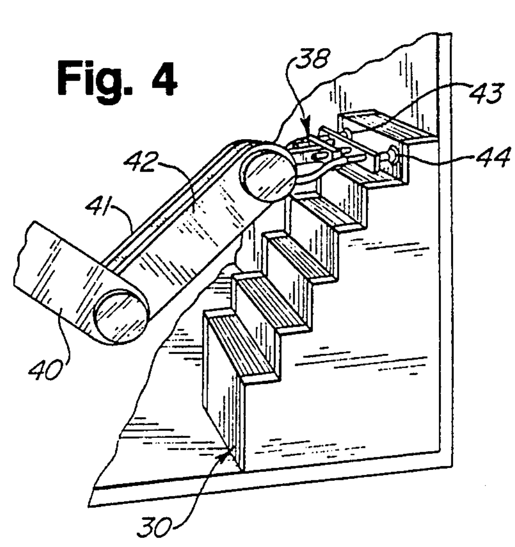
FIG. 4 is a perspective view illustrating the pick-up of a sheet of material from a storage rack.

Reference numeral 10 generally designates a vending machine which is constructed in accordance with the principles of this invention and which is designed for vending personalized greeting cards. It should be understood that various features of the invention are not limited to a vending machine for personalized greeting cards and may be used in conjunction with the vending of other products of sheet material as well as in the vending of other products.

The machine 10 includes presentation means including a screen 11 which is operable to present identifications of the available greeting card products and also including voice generating means for developing an associated audible description of products. In an introductory presentation mode, such presentation means are operable to present a sequence of identifications of the available greeting cards and desirable attributes and features thereof to persons in the vicinity of the machine 10. Operating instructions are also presented in the introductory presentation mode.

By way of example, the machine 10 may be used to vend products including "The Birthday Times", "The Anniversary Times", a number of "Peanuts" birthday greeting cards, and also a Santa Claus greeting. In each case, the name or names of the receiver or receivers may be printed on the product and the name of the sender of the product may also be printed, when appropriate. In the case of "The Anniversary Times" product and "The Birthday Times" product, text relating to the birthdate or the anniversary date may be printed on the card in a manner as hereinafter described.

In the illustrated embodiment, the screen 11 is operable as a touch screen for selection of the product and for entering of name, date and other data. The customer is invited to touch a portion of the screen to indicate an intention to purchase a selected one of the available products and is then instructed audibly through voice generating means and visually through the screen 11 to effect payment for the product. Payment may be effected by insertion of coins in a coin slot 12, insertion of a bill in a bill receiving device 13 or temporary insertion of a credit card in a credit card reader 14. Change cup 15 is provided for delivering any change which may be due, and a receipt 16, as indicated, may be delivered through a receipt delivery slot 17.

As an example of the operation, the customer may touch a portion of the screen labeled "The Birthday Times" and he or she is then asked to pay a specified price by depositing coins, a bill or effecting a credit card entry. Then a screen is produced bearing the letters of the alphabet and the customer is asked to touch the screen to enter the first name of the recipient and then the last name of the recipient.

Next, a screen is produced bearing indicia of the months of the year and the customer is asked to respond, additional screens being produced for entry of the date and year of birth of the recipient. Then a screen image is produced which reproduces the entries made by the customer who is then asked if any corrections are necessary. If he or she answers "yes", screens are produced for selection of the entry to be corrected and instructing the customer how to make changes. Once the entry is approved by the customer, the screen and associated voice reproduction are produced thanking the customer and telling the customer that the greeting card will be printed. With variations, similar types of programs are used for "The Anniversary Times", "Peanuts" cards and "Letter from Santa".

A delivery receptacle 18 is provided into which the selected product is delivered, along with envelope or other required associated materials. The delivery receptacle 18, the screen 11, coin slot 12, bill receiver 13 and credit card reader 14 are positioned on an inclined front panel 20 of a housing 21. The change cup 15 and receipt delivery slot 17 are in a front panel 22 below the inclined panel 20. The housing 21 further includes side walls 23 and 24 and a rear wall 25. At the top, an ornamental neon light structure 26 is provided.

As shown somewhat diagrammatically in FIGS. 2 and 3, a robot 28 is provided within the housing 21. Robot 28 operates to pick up a pre-printed form from a storage rack 30 and to deliver the form to a printer 31 for printing of personalized data thereon. While the personalized data is being printed, the robot 28 may pick up associated materials such as an envelope and folder from a storage rack 32 and deliver such materials to a handling device 34. In references hereinafter to the envelope storage rack 32 and to transfers of envelopes therefrom, it should be understood that associated materials in addition to or other than an envelope may be transferred.

After printing of personalized data on the preprinted sheet is completed, the robot 28 moves the sheet to the handling device 34. Handling device 34 is then operated to be rotated and elevated to a position for delivery of the printed sheet and envelope to the delivery receptacle 18 and, for brevity, device 34 is referred to herein as the elevator 34.

FIG. 3 is a rear perspective view of the machine with the rear wall 25 removed. The robot 28 includes a turret head 36 which is rotatable about a vertical axis and which is connected to a transfer head 38 through an articulated arm assembly which includes a first pair of parallel links 39 and 40 each pivotally connected at one end to the head 36 and a second pair of parallel links 41 and 42 having ends pivotally connected to opposite ends of links 39 and 40 and having opposite ends pivotally connected to the transfer head 38. The transfer head 38 includes a pair of suction cups 43 and 44 for engaging, holding and releasing sheets, envelopes or other products to be handled by the machine.

The robot 28 is a commercially available type of robot and includes electro-mechanical components which are not shown in detail. Such components are responsive to applied electrical signals to accurately control rotation of the turret head 36 about a vertical axis, rotation of links 39 and 40 about a horizontal axis of rotation relative to the turret head 36, rotation of the links 41 and 42 about a horizontal axis relative to the links 39 and 40 and rotation of the transfer head 38 about a horizontal axis relative to the links 41 and 42.

The storage racks 30 and 32, which are used for preprinted forms and envelopes in the disclosed machine, have similar constructions. Each has a series of vertically extending compartments arranged in steps, each compartment being arranged to receive a stack of forms or envelopes, with an uppermost portion of the outer form or envelope of each stack being exposed and facing radially inwardly toward the axis of rotation of the turret head 36, so that it may be engaged by the suction cups 43 and 44 of the transfer head 38.

FIG. 4 shows the pick-up of a form 45 from the uppermost stack of rack 30, it being noted that FIGS. 11–15 show in more detail specific and important features relating to the construction of the rack 30 and the interaction of the suction cups 43 and 44 with the form 45, operative to obtain highly reliable operation as hereinafter discussed in conjunction with FIGS. 11–15. The uppermost stack of the rack 30 may, for example, contain forms entitled "The Anniversary Times". To pick up one of such forms, the robot is so controlled as to position the transfer head 38 in horizontal alignment with the exposed upper portion of the form 45, the transfer head 38 being then moved radially outwardly until the suction cups 43 and 44 engage form 45. Then the suction cups are moved upwardly a short distance to separate the single exposed form from the second form therebehind, and then suction is applied to the cups 43 and 44, this operation being described in more detail in connection with FIGS. 11–15. After suction is applied, the transfer head 38 is then moved further upwardly to a position at which the lower edge of the form 45 clears the upper edges of all forms in the storage rack 30.

After picking up the form 45 from the storage rack 30 and after moving the transfer head 38 radially inwardly, the turret head 36 is rotated ninety degrees in a counterclockwise direction, as viewed from above as in FIG. 3, to position the transfer head 38 in register with the printer 31 and at an elevated position.

Figure 5:
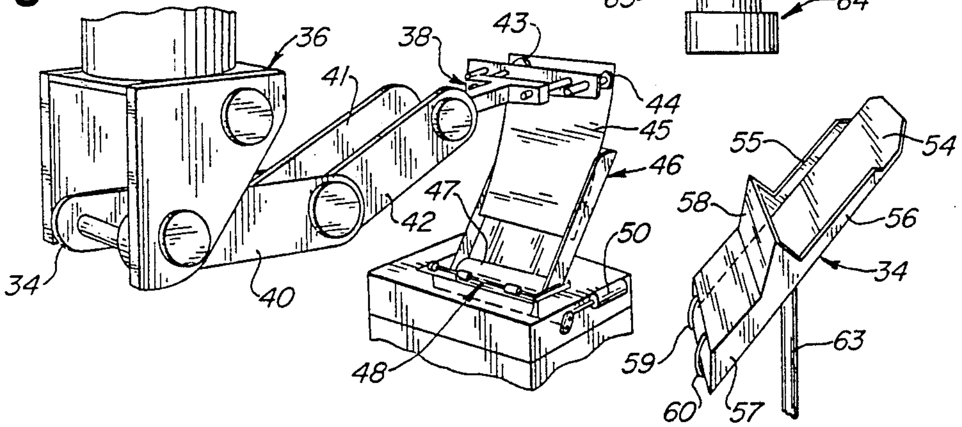
FIG. 5 is a perspective view illustrating the delivery of a sheet of material to a printer.

Transfer head 38 is then moved radially outwardly to a position as shown in FIG. 5 in which a lower edge portion of the form 45 is against and between out-turned side edges of an inclined sheet guide 46 of the printer 31. The guide 46 is positioned to guide the form 45 into a position for driving engagement by an impression roller 47 of the printer 31. A reverse roll of the impression roller 47 is then effected to accurately align the leading edge of the form 45 with respect to the roller 47 prior to rotation of the roller through a predetermined set angle to position the form for printing. As a result, data printed on the form 45 is accurately positioned relative to the form and pre-printed matter thereon.

A bail 48 of the printer 31, which would normally be operated manually, is connected to an air cylinder 50 for operation thereby. When the form 45 is delivered to the printer 31, rollers of the bail 48 are held away from the impression roller 47 which is driven until the leading edge of the form is between the rollers of the bail 48 and the impression roller 47. Then the bail 48 is operated by the air cylinder 50 so that the rollers hold the form against the impression roller 47. The printer is then operated to print personalized data on the form 45.

After delivery of the form to the printer 31 and while the printer 31 is being operated, transfer head 38 is operated to effect an envelope transfer operation in which an envelope is picked up from the storage rack 32 and transferred to the elevator 34. To do so, the transfer head 38 is first moved radially inwardly toward the vertical axis of rotation of the turret head 36; then the turret head 36 is rotated ninety degrees in a counterclockwise direction as viewed from above; then transfer head 38 is moved downwardly to a position opposite the upper end portion of an envelope to be picked up and then radially outwardly to engage the envelope with suction being then applied to the suction cups 43 and 44; then the transfer head 38 is moved directly upwardly to a position such that the lower end of the envelope clears the bin structure; then the transfer head 38 is moved radially inwardly; then the turret head 36 is rotated one-hundred and thirty five degrees in a clockwise direction as viewed from above; then the transfer head 38 is moved radially outwardly to position the envelope above the elevator 34 and the transfer head 38 is moved downwardly to insert the envelope into the elevator 34 after which suction is released to allow the envelope to move downwardly into the elevator 34.

Figure 6:
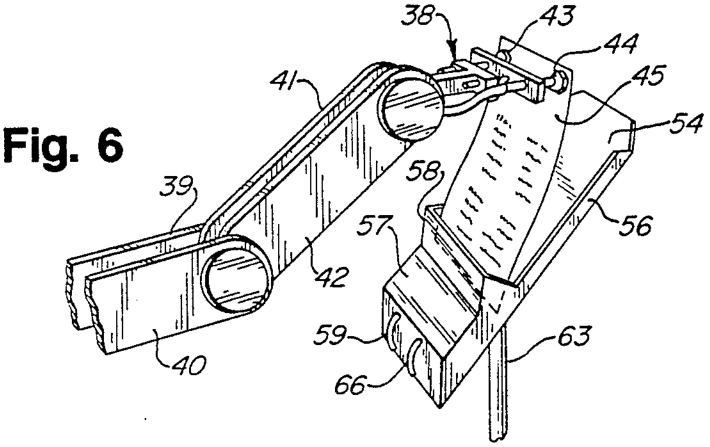
FIG. 6 is a perspective view illustrating the delivery of a sheet of material to a transfer device.

The elevator 34 includes an inclined back wall 54, a pair of side guide walls 55 and 56, a lower retaining wall portion 57 extending between the guide walls 55 and 56 in spaced parallel relation to a lower portion of the back wall 54 and an upper retaining wall portion 58 extending between the guide walls 55 and 56 and extending upwardly and outwardly from the upper end of the lower wall portion 57. A pair of retaining elements 59 and 60 extend upwardly from the lower edge of the back wall 54 to be engaged by the lower edge of and to limit downward movement of a form or envelope dropped into the device 46. An actuator 62 is provided for the retaining elements 59 and 60 which may be operated by compressed air and which is arranged to rotate the elements 59 and 60 between retaining position as shown in FIGS. 5 and 6 and a release position as shown in FIG. 7, in which the elevator 34 is in an elevated position above the delivery receptacle 18 and in which the elevator 34 is in an angular position with the lower edge thereof above and just inside the upper end of the receptacle 18.

Figure 7:
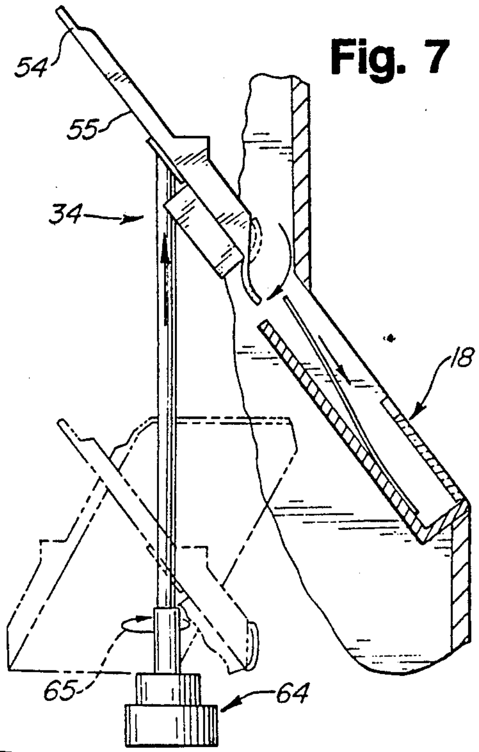
FIG. 7 is an elevational sectional view illustrating a transfer device of the machine in an elevated delivery position.

To move the elevator 34 between the product receiving position as shown in FIGS. 2, 3, 5 and 6 and the delivery position of FIG. 7, the elevator 34 is supported on a vertical rod 63 which is supported by an actuator 64 arranged to both rotate the rod 63, as indicated by arrow 65, and move the rod 63 vertically, as indicated by arrow 66. Actuator 64 may preferably be operated by compressed air, through electrically controlled valves, to control rotation and to control vertical movement.

To supply compressed air for operation of components including the bail-operating cylinder 50, the elevator release actuator 62 and the elevator actuator 64, a compressor 68 is provided which is physically located on a floor portion of the machine between a support for the elevator actuator 64 and the front wall 21.

A vacuum pump 66 is mounted on a horizontal shelf 67 which supports a journalling structure 68 for the turret 36 of the robot 28. An upper shelf 69 supports a computer 70 which controls operation of the various components of the machine. Computer 70 is coupled to the robot 36 through a robot controller unit 71. It is also coupled to a VCR 72 which supplies certain audio-visual signals and which may be replaced by a compact disc unit or any equivalent thereof. Both the robot controller unit 71 and the VCR 72 are mounted on the shelf 69 and a keyboard 73 for the computer may be stored above the robot controller unit 71 to be pulled out and used for initial set-up operations, maintenance and reprogramming, when desired. An audio mixer unit 74, line conditioner 75 and an optical/electronic interface 76 for the VCR 72, compressor 68, printer bail actuating cylinder 50 and other functions is disposed on a shelf 77 below the shelf 69. An additional shelf 78 supports a series of manually operable switches 81 which are usable for direct control of the air operated devices for set-up and testing purposes.

Figure 8:
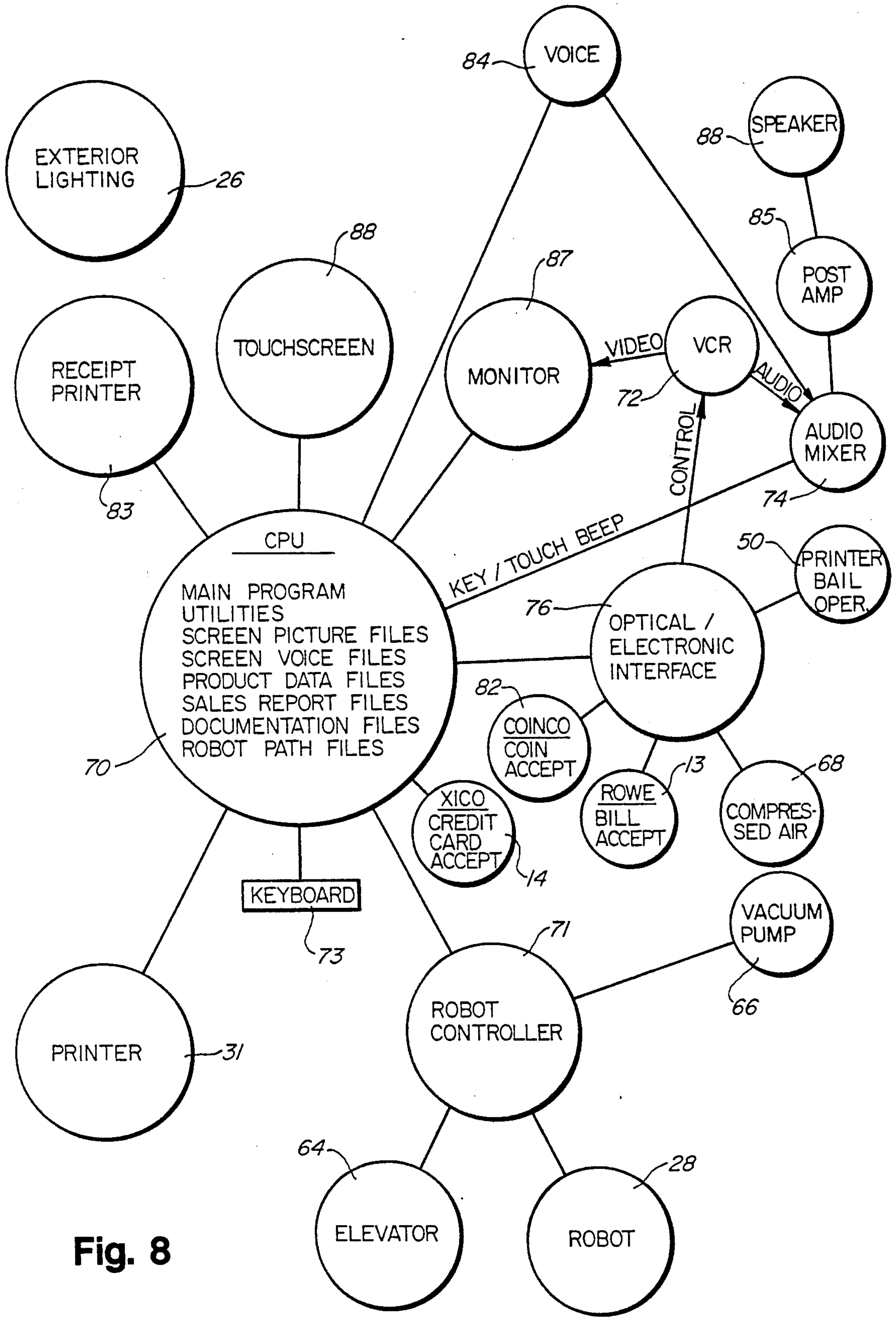
FIG. 8 is a schematic diagram which illustrates the various components of the machine and the functional relationship and interaction thereof.

FIG. 8 illustrates the interconnection and functional relationship of components of the machine. The computer 70 provides a central processing unit or CPU which is coupled to the credit card reader 14 to receive an "accept" signal therefrom and which is also coupled through the optical/electronic interface 76 to a coin accept unit 82 associated with the coin slot 12 and to the bill receiver 13. Computer 70 is also connected to the printer 31, the robot controller unit 71, the keyboard 73, the audio mixer 74 and to a receipt printer 83. Robot controller unit 71, in addition to controlling the robot 28, also controls the valves which control the rotation and vertical movement of the elevator 34 through the actuator 64.

Computer 70 is also connected to a voice generator 84 coupled to the audio mixer 74 which supplies an output audio signal through an amplifier 85 to a speaker 86. In addition computer 70 is connected to circuitry and an associated CRT which provides the display and touch screen 11, such circuitry and CRT providing both a display or monitor 87 and an input device in the form of a touchscreen 88 as indicated in the functional diagram of FIG. 8. Through the interface 76, the computer 70 also controls the compressor 68 and the printer bail operating cylinder 50.

For use in operation of the computer 70, a main program is stored in memory which operates in conjunction with stored screen picture files, screen voice files, product data file, sales report files, documentation files and robot path files as indicated in FIG. 8.

When not operating in response to a customer-generated input, the machine operates in an introductory presentation mode in which the VCR 72 is controlled through the interface 76 to apply audio and video signals to the audio mixer 74 and the monitor 87 and to present a sequence of identifications of products and attributes and features thereof to persons in the vicinity of the machine 10. By way of example, a 2 minute sequence may consist of a 1 minute segment devoted to the "Peanuts" product may by followed by 30 second segments devoted to "The Birthday Times" and "The Anniversary Times" products. Fifteen of such 2 minute sequences may be recorded on a 30 minute section of video tape which, when ended, is automatically rewound and restarted.

Figure 9A:
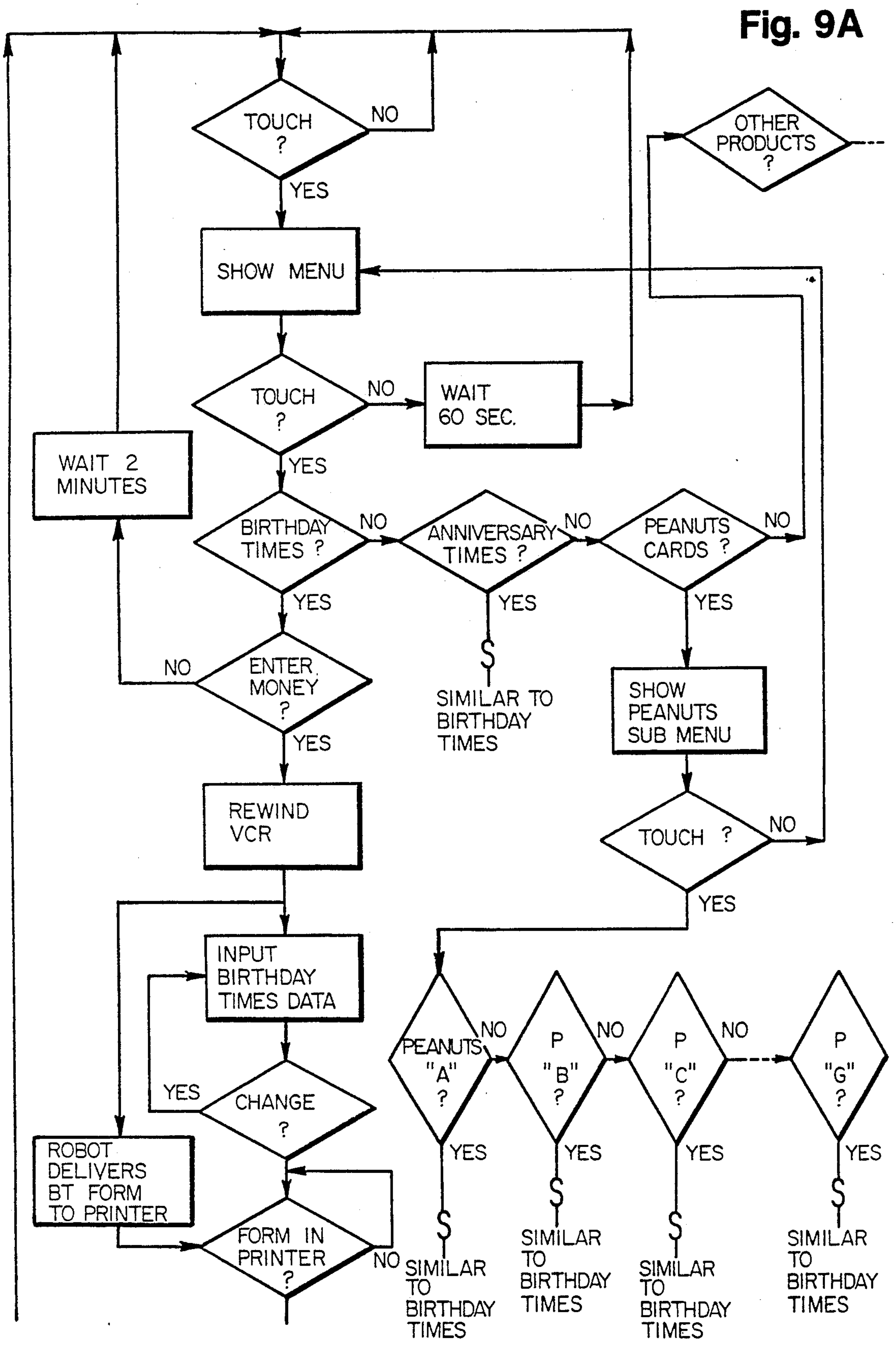
FIGS. 9A and 9B form a flow chart illustrating various operations performed by the machine under computer control.
Figure 9B:
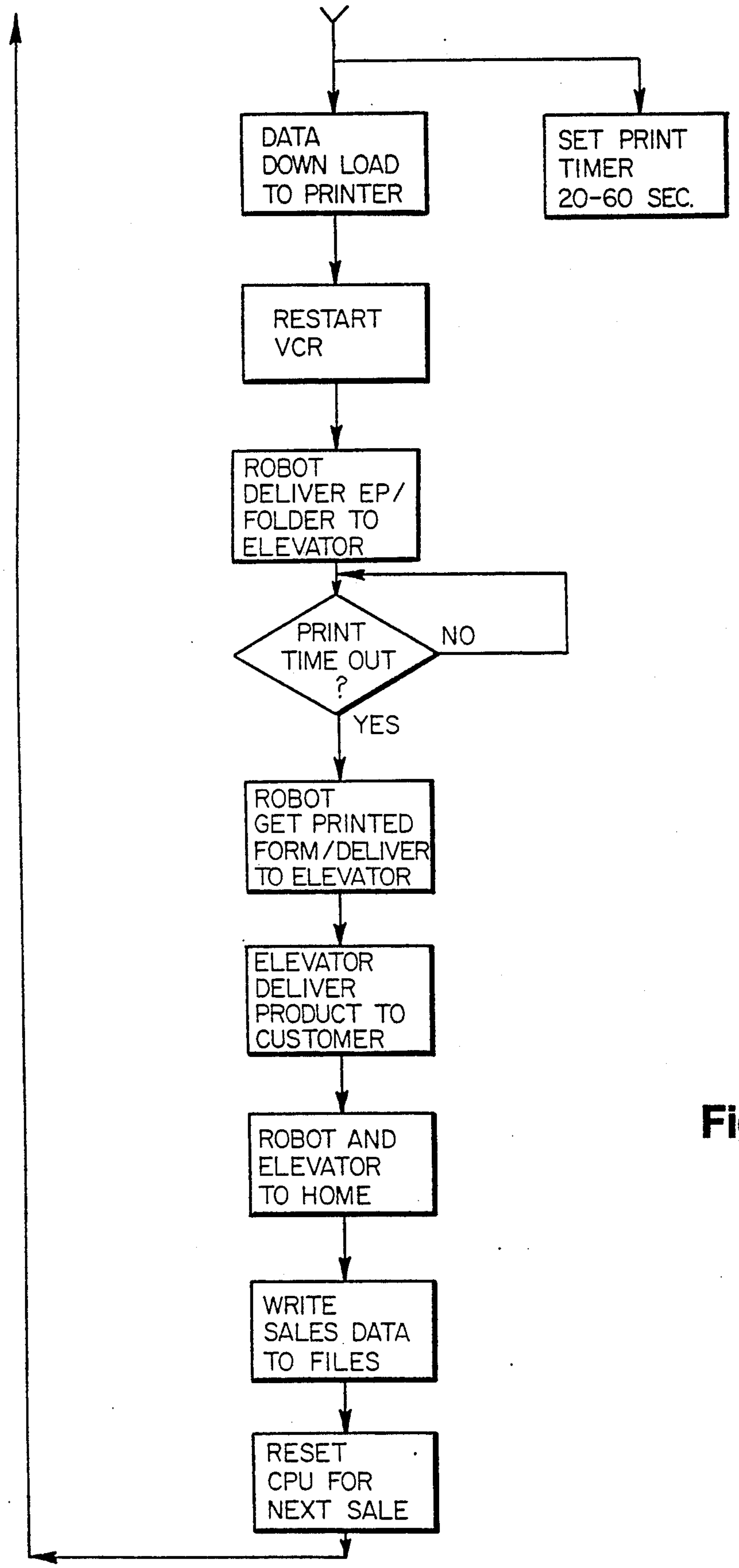
Figure 9B:
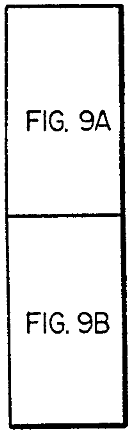

While the VCR 72 is so operating in the introductory presentation mode, the computer continually checks for any touch of the screen by a customer, in response to the invitation made in the introductory presentation. FIGS. 9A and 9B together form a flow chart illustrating the operation of the machine in checking for touching of the screen and in response to such touching. Initially, a menu of the available options is shown, inviting the customer to select between "The Birthday Times", "The Anniversary Times" and "Peanuts", in the illustrated system.

As shown, if "The Birthday Times" is selected, a check is made as to whether money has been entered, i.e. whether payment has been effected through deposit of coins or a bill or through a credit card read and confirmation thereof. If so, the cassette of the VCR 72 is rewound and also a command is issued for the robot 28 to get a "BT" form to the printer 31. Similarly, in response to selection of "The Anniversary Times", a command is issued after payment is effected for the robot 28 to get the "The Anniversary Times" form to the printer 31. The operation is also similar in response to a "Peanuts" selection differing only in that the customer is asked to make a selection from among a number of "Peanuts" cards. Once that selection is made and payment is effected, a command is issued for the robot 28 to get the corresponding form to the printer 31. In each case, a sequence for entry of data by the customer is initiated at the same time that the command is issued to the robot to get the appropriate from to the printer. This feature is important in that it minimizes the time required to get a final product to the delivery receptacle 18.

In connection with FIGS. 8, 9A and 9B, the single computer 70 of the disclosed embodiment operates in a quasi-multitasking mode such that, in effect, the operation of the robot 28 is simultaneous with the handling of operations which involve a customer, the latter taking precedence. Movements of the robot such as those required in transferring a form to the printer are made in response to a series of instructions which are determined by the computer 70 and sent to the robot controller 71 with short time intervals therebetween. At the end of each such short time interval and also upon completion of any operation involving a customer, such as the audible and visual presentation of options or a request for payment, a check is first made for any input or other operation which might be invoked by the customer, such as touching of the screen or payment of money. In the absence of any required operation involving the customer, any instruction which may be required by the robot controller 71 is sent thereto. This operation insures that operations involving the customer are handled promptly, without waiting for completion of an operation by the robot 28, but allows the robot to be operated at near maximum speed since it is not disabled while the system is waiting for a response from the customer. Operations involving the customer can processed in comparatively short times. It will be understood that a separate computer dedicated to control of the robot 28 or other equivalent arrangements may be used to effect operation of the robot 28 while simultaneously performing operations which involve the customer or other operations.

After personalized data has been selected and approved by the customer and after the required form is in the printer, the data is downloaded to the printer, the VCR 72 is restarted and a command is issued for the robot to deliver the appropriate envelope from the storage rack 32 to the elevator 34. Thus the transfer of the envelope is effected at the same time that the printer is operating, thereby further minimizing the time required to deliver the final product.

Figure 10A:
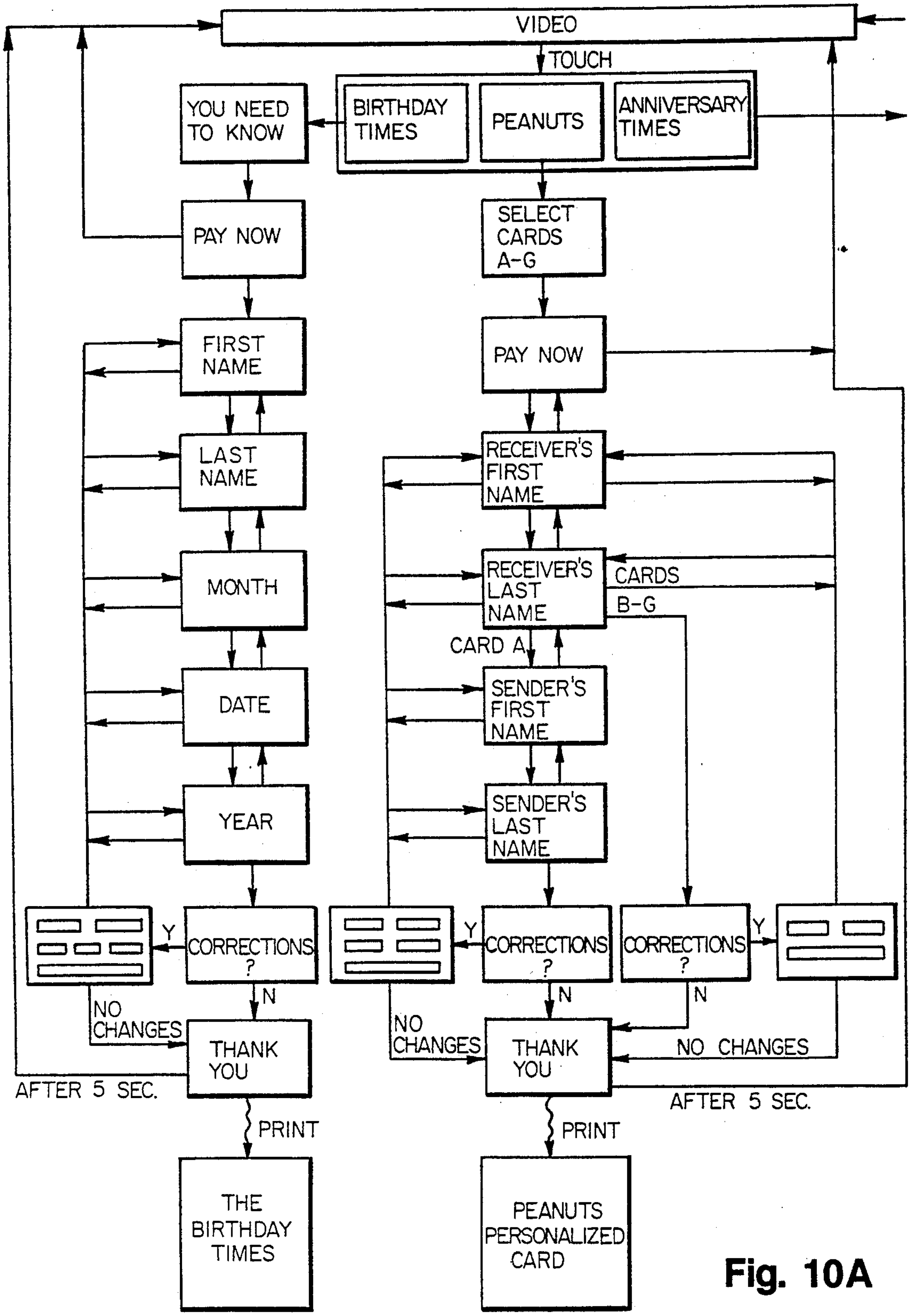
FIGS. 10A and 10B form a flow chart illustrating instruction and selection processes performed by the machine under computer control.
Figure 10B:
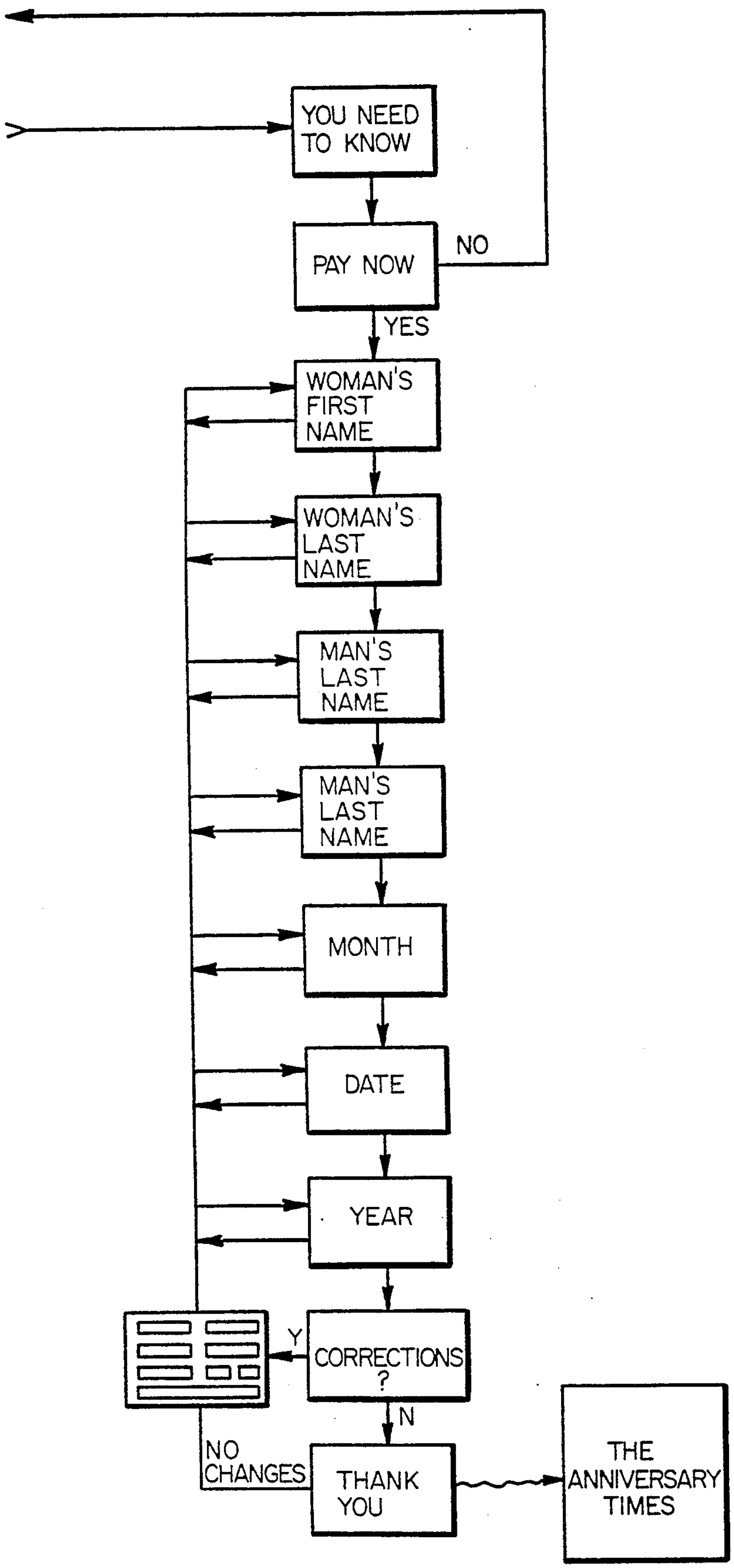
Figure 10B:
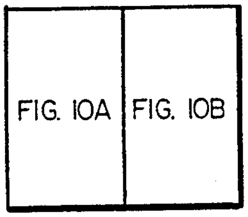

FIGS. 10A and 10B together form a flow chart which illustrates in more detail the processes for the entry of data required for the illustrated types of products. The customer is given clear instructions as to what he or she needs to know before making payment and, after making payment, instructions which facilitate rapid entry of accurate data, with provisions for checking entered data and correcting if necessary. The customer may take as much time as necessary, but since delivery of the required form to the printer takes place during data entry, any delay which might otherwise occur is minimized.

As aforementioned in the discussion of FIG. 4, FIGS. 11-15 illustrate important specific features which relate to the construction of storage racks and the operation of the suction cups 43 and 44 in picking up forms, envelopes or other items. As also aforementioned, the uppermost bin of the storage rack 30 may contain preprinted forms for "The Birthday Times", including the aforementioned form 45 which is the front form of a stack of forms indicated by reference numeral 90. The upper part of that bin is shown in FIGS. 11-15 and it includes a rear wall 92, a pair of side walls 93 and 94 and a front wall 96 the upper edge of which is lower than the upper edges of the stack of forms 90. The bins of each rack have a stepped relationship and the front wall of each bin may form the rear wall of the next lower bin. Although not shown, it will be understood that each bin has a lower wall or floor so positioned in relation to the height of the form as to expose the upper portion of the form for pick up.

The side walls 93 and 94 have in-turned upper edge portions 97 and 98 which overlie the side edges of each form of the stack 90 and triangularly shaped tabs 99 and 100 are provided having edges joined to the forward edges of the inturned side wall portions 97 and 98 and to the adjacent upper portions of the side walls 93 and 94. A pressure plate 102 is disposed behind the stack 90 and is urged forwardly by a spring 103 to urge the stack 90 forwardly and to engage the upper forward corners of the front form 45 with the tabs 99 and 100.

Initially, the suction cups 43 and 44 are moved outwardly relative to the vertical axis of the robot turret 36 to bring the upper portions of the form 45 into pressure engagement as shown in FIG. 11. Then the cups 43 and 44 are moved upwardly and, through frictional engagement with the cups 43 and 44, the form 45 is moved upwardly while the upper corner portions thereof buckle slightly as shown in FIG. 12 to move upwardly past the tabs 99 and 100 and the in-turned edges 97 and 98 of the side walls 93 and 94. During this operation, there is no corresponding frictional engagement with a second form which is immediately behind the front form 45 and which is indicated by reference numeral 104 in FIG. 15. In FIG. 15, the thicknesses of the forms are exaggerated to more clearly illustrate the operation. Suction is applied after such initial upward movement of the form 45, when the cups 43 and 44 are about at a position as shown in FIG. 15. Then with additional upward movement of the cups 43 and 44, the form 45 is completely withdrawn from the bin.

This pick-up operation is highly advantageous in obtaining reliable operation. It insures against pick-up of more than one form as has been found to take place because of transmission of suction through a porous form to a form or forms therebehind. It should be understood that other types of relative movements may be used to cause the leading sheet to buckle or otherwise separate from the next sheet therebehind.

In the machine as illustrated, the base products in the storage bin 30 are pre-printed forms but it will be understood that the base products may be of unprinted stock and /or rolls of paper stock that are cut to size within the operation and that one or more printing operations may be effected in response to input data from a customer to produce the desired final product. The machine of the invention is particularly advantageous when used in conjunction with products of sheet material as illustrated but it will be understood that various features of the invention may be used in conjunction with other products and particularly products which are produced on order on a custom basis through making of selected modifications of a plurality of base product forms. It will also be understood that other modifications and variations may be effected without departing from the spirit and scope of the novel concepts of the invention.

We claim:

1. A machine for delivering a product which may be automatically personalized by the customer at the time of purchase and which is selected from a plurality of different products, said machine comprising: storage means for storing base products, delivery receptacle means, product handling means for effecting a series of operations and including electrically controllable transfer means for effecting transfer of a base product from said storage means, electrically controllable modification means for effecting modification of said base product to produce a modified base product and electrically controllable delivery means for effecting delivery of said modified base product to said delivery receptacle means, an enclosure containing said storage, receptacle and product handling means therewithin, selection means operable by a customer on the outside of said enclosure to effect entry of control data which defines the desired final form of the personalized product to be delivered to the customer, and computer means within said enclosure and coupled to said selection means and to said electrically controllable transfer, modification and delivery means of said product handling means, said computer means controlling said transfer, modification and delivery means of said product handling means to perform a series of operations in accordance with said control data, said series of operations being performed within said enclosure without operator intervention and including transfer of a base product from said storage means, modification of a base product transferred from said storage means and delivery of the desired final form of product from said modification means to said delivery receptacle means, wherein said selection means includes display means arranged for display of said different products for selection by a customer.

2. A machine as defined in claim 1, wherein said storage, product handling, selection and computer means are arranged for handling a variety of products, whereby said machine provides a flexible manufacturing platform for one-of-a-kind personalized products.

3. A machine as defined in claim 1, wherein the selections available to the customer define a large number of types of finished products, whereby said machine operates on a just-in-time basis to eliminate a large finished goods inventory which would otherwise be required.

4. A machine as defined in claim 1, wherein said selection means comprises electronically alterable presentation means for presentation of options available to a customer for selection of the desired final form of the product, whereby the forms of products offered by said machine may be quickly altered.

5. A machine as defined in claim 1, wherein said base products include base products in the form of sheets of sheet material and wherein said modification means of said product handing means include printing means for printing personalized data on said base products.

6. A machine as defined in claim 5, wherein said printing means includes a printer having an impression roller, sheet receiving and guide means positioning a sheet for engagement with said impression roller, said printer being controlled to drive said roller in a reverse direction to place said lower edge at a predetermined position and to then drive said roller through a certain angle in a forward direction to accurately place a leading edge of the sheet at a certain substantially fixed start position prior to printing of data thereon.

7. A machine as defined in claim 1, wherein said storage means include means for storing a stack of base products in the form of sheets of sheet material and wherein said handling means comprises suction pick-up means cooperative with said storage means for frictional engagement with a leading sheet of said stack to effect an initial separation from remaining sheets of said stack followed by the application of suction to completing remove said leading sheet from said stack.

8. A machine as defined in claim 1, further including start means coupled to said computer means for initiating performance of said series of operations in accordance with said control data.

9. A machine as defined in claim 8, said start means including payment means operable by a customer on the outside of said enclosure to effect payment for a product.

10. A machine as defined in claim 1, wherein said base products include sheets of greeting card stock, and wherein said modification means include means for applying indicia to a transferred sheet of greeting card stock to form a completed personalized greeting card.

11. A machine as defined in claim 10, wherein said modification means include means for applying message indicia of a selectable form to a transferred sheet of greeting cards stock, and wherein said selection means include means for selecting the form of message indicia to be applied to a transferred sheet of greeting card stock.

12. A machine as defined in claim 11, wherein said selection means includes means for selecting characters from a complete alphabet for composition of the form of message indicia to be applied to a transferred sheet of greeting card stock.

13. A machine as defined in claim 12, wherein said display means include a touch screen on which complete alphabet is displayed to be touched by a customer for selection the form of message indicia to be applied to a transferred sheet of greeting card stock.

14. A machine as defined in claim 10, wherein said base products include sheets of greeting cards having various indicia printed thereon to provide various forms of greeting cards.

15. A machine as defined in claim 10, wherein said base products include blank sheets of greeting card stock, and wherein said modification means include means for applying graphic indicia to a transferred sheet of greeting card stock in forming a completed personalized greeting card.

16. A machine as defined in claim 1, wherein said display means include a touch screen for display and selection of said different products and for display of operating instructions.

17. A machine as defined in claim 16, further including audio means for providing operating instructions and indications to a customer.

18. A machine for delivering a product which may be automatically personalized by the customer at the time of purchase and which is selected from a plurality of different types of products, said machine comprising: storage means for storing base products, delivery receptacle means, product handling means for effecting a series of operations including transfer of a base product from said storage means, modification of said base product to produce a modified base product and delivery of said modified base product to said delivery receptacle means, an enclosure containing said storage, receptacle and product handling means therewithin, payment means operable by a customer on the outside of said enclosure to effect payment of a product, selection means operable by a customer on the outside of said enclosure to effect entry of control data which defines the desired final form of the personalized product to be delivered to the customer, and computer means within said enclosure and coupled to said payment, selection and product handling means, said computer means controlling said product handling means following payment by a customer to perform said series of operations in accordance with said control data and to effect delivery of the desired final form of product to said delivery receptacle means, wherein said storage means include means for storing a stack of base products in the form of sheets of sheet material and wherein said handling means comprises suction pick-up means cooperative with said storage means for frictional engagement with a leading sheet of said stack to effect an initial separation from remaining sheets of said stack followed by the application of suction to completing remove said leading sheet from said stack, and wherein said storage means include restraining means engageable with end edge portions of sheets of said stack adjacent side edges thereof, said leading sheet being buckled to move past said restraining means during said initial separation while said restraining means prevent movements of sheets behind said leading sheet.

19. A machine for delivering a product selected from a plurality of different types of products, said system comprising: presentation means for presenting identification of said products, selection means for entry of a selection of one of said types of products, payment means operable to effect payment by a customer for a selected product, receptacle means for holding a selected and delivered product until removal by a customer, an enclosure supporting said presentation, selection, payment and receptacle means, storage means within said enclosure including a plurality of separate compartments for storing said plurality of different types of products, product modification means within said enclosure for effecting controllable modifications of each of said plurality of different types of products, product transfer means within said enclosure arranged to move a single product away from a compartment and to said modification means and to thereafter move the product after modification to said respectable means, and control means within said enclosure and coupled to said product identification, selection, payment, product modification and product transfer means, said control means including computer means programmed to control operation of said presentation means and to respond to payment and entry of a selection by a customer to effect movement of a corresponding product away from one of said compartments and to said receptacle means, said presentation means being controllable by said computer after a payment by a customer to operation in a selection mode to present instructions for further operations by the customer to effect selections of a product and to effect selections of modifications of the selected product in accordance with preferences of the customer.

20. A machine for delivering a product which is selected from a plurality of different types of products, said machine comprising: storage means for storing base products, delivery receptacle means, product handling means for effecting a series of operations including transfer of a base product from said storage means, modification of said base product to produce a modified base product and delivery of said modified base product to said delivery receptacle means, an enclosure containing said storage, receptacle and product handling means therewith, selection means operable to effect entry of control data which defines the desired final form of a product to be delivered to said delivery receptacle means, and computer means within said enclosure and coupled to said selection and product handling means, said storage means being arranged to store a plurality of base products of different types, and said product handling means including modification means for effecting modifications of said base products and transfer means for selective transfer of said base products of different types to said modification means and transfer of modified base products to said delivery receptacle means, said computer means controlling said modification and transfer means of said product handling means in accordance with said control data to transfer a selected base product to said modification means and to effect modification of the selected base product in accordance with said control data and to then effect transfer of the desired final form of product to said delivery receptacle means, wherein said selection means includes means for presenting options for selection including a type select option determinative of the type of base product to be delivered to said modification means and modification options determinative of modifications to be performed by said modification means, said type select option being presented prior to said modification options, and computer means being operative in response to said type select option to initiate transfer of the selected type of base product to said modification means while said modification options are presented for selection by said selection means.

21. A machine as defined in claim 20, wherein said transfer means are arranged for transfer of base products of certain types for assembly with modified base products of other types to produce the desired final product.

22. A machine for delivering a product which is selected from a plurality of different types of products, said machine comprising: storage means for storing base products, delivery receptacle means, product handling means for effecting a series of operations including transfer of a base product from said storage means, modification of said base product to produce a modified base product and delivery of said modified base product to said delivery receptacle means, an enclosure containing said storage, receptacle and product handling means therewith, selection means operable to effect entry of control data which defines a desired final form of a product to be delivered to said delivery receptacle means, and computer means within said enclosure and coupled to said selection and product handling means, said storage means being arranged to store a plurality of base products of different types, and said product handling means including modification means for effecting modifications of said base products and transfer means for selective transfer of said base products of different types to said modification means and transfer of modified base products to said delivery receptacle means, said computer means controlling said modification and transfer means of said product handling means in accordance with said control data to transfer a selected base product to said modification means and to effect modification of the selected base product in accordance with said control data and to then effect transfer of the desired final form of product to said delivery receptacle means, wherein said selection means includes means for presenting options for selection including a type select option determinative of the type of base product to be delivered to said modification means and modification options determinative of modifications to be performed by said modification means, said type select option being presented prior to said modification options, and computer means being operative in response to said type select option to initiate transfer of the selected type of base product to said modification means while said modification options are presented for selection by said selection means, wherein said transfer means are arranged for transfer of base products of certain types for assembly with modified base products of other types to produce the desired final product, and wherein said computer being operative to control said transfer means to effect transfer of a base product of one of said certain types to an assembly point while controlling said modification means to modify a base product of one of said other types and to thereafter control said transfer means to transfer a modified base product from said modification means to said assembly point.

23. A machine for delivering a product which is selected from a plurality of different types of products, said machine comprising: storage means for storing base products, delivery receptacle means, product handling means for effecting a series of operations including transfer of a base product from said storage means, modification of said base product to produce a modified base product and delivery of said modified base product to said delivery receptacle means, an enclosure containing said storage, receptacle and product handling means therewithin, selection means operable to effect entry of control data which defines a desired final form of a product to be delivered to said delivery receptacle means, and computer means within said enclosure and coupled to said selection and product handling means, said storage means being arranged to store a plurality of base products of different types, and said product handling means including modification means for effecting modifications of said base products and transfer means for selective transfer of said base products of different types to said modification means and transfer of modified base products to said delivery receptacle means, said computer means controlling said modification and transfer means of said product handling means in accordance with said control data to transfer a selected base product to said modification means and to effect modification of the selected base product in accordance with said control data and to then effect transfer of the desired final form of product to said delivery receptacle means, wherein said transfer means includes a turret head pick-up means supported by said head, said turret head being rotatable about a vertical axis to selectively position said pick-up means opposite storage and modification stations at different angular positions about said axis and said pick-up means being operable for pick-up of a base product at a storage station and transfer thereof to a modification station.

24. A machine as defined in claim 23, wherein said product handling means includes a transfer device at a transfer station at an angular position different from the angular positions of said storage and modification stations, said pick-up means being operable for transfer of a modified base product from said modification station to said transfer station.

25. A machine as defined in claim 24, wherein said transfer device is operable for transfer of a product to said delivery receptacle means.

26. A machine as defined in claim 25, wherein said transfer device is rotatable about a vertical axis for movement between a position for receiving a product from said pick-up means and a position for delivery of a product to said delivery receptacle means.

27. A machine as defined in claim 26, wherein said selection means and said delivery means are located at level for ready access by a person standing in front of said enclosure, and wherein said transfer station is at a level which is substantially lower than the level of said transfer station, said transfer device being movable upwardly to a level above the level of said delivery receptacle means and being arranged to deposit a modified product in said delivery receptacle means.

28. A machine as defined in claim 23, wherein an additional storage location and an assembly location are provided at an angular positions different from each other and those of the first-mentioned storage location and said modification station, said turret head and said pick-up means thereon being operable for pick-up of a base product from said additional storage location and transfer thereof to said assembly location and being also operable for pick-up of a modified base product from said modification means to said assembly location.

* * * * *

UNITED STATES PATENT AND TRADEMARK OFFICE
CERTIFICATE OF CORRECTION

PATENT NO. : 5,036,472

DATED : July 30, 1991

INVENTOR(S) : Stephen P. Buckley, et al

It is certified that error appears in the above-identified patent and that said Letters Patent is hereby corrected as shown below:

Column 1, line 66 - "o" should be --of--;

Column 1, line 67 - "an" should be --and--;

Column 2, line 1 - "product" should be --products--.

Claim 1, Column 11, lines 53 and 54 - delete extraneous spacing and indentation between "means," and "wherein" such that claim reads as one continuous paragraph;

Claim 1, Column 11, line 55 - delete extraneous indentation prior to "arranged" such that claim reads as one continuous paragraph;

Claim 1, Column 11, line 56 - delete extraneous indentation prior to "selection" such that claim reads as one continuous paragraph;

UNITED STATES PATENT AND TRADEMARK OFFICE
CERTIFICATE OF CORRECTION

PATENT NO. : 5,036,472

DATED : July 30, 1991

INVENTOR(S) : Stephen P. Buckley, et al

It is certified that error appears in the above-identified patent and that said Letters Patent is hereby corrected as shown below:

Claim 20, Column 14, line 23, the word "therewith" should be --therewithin--;

Claim 22, Column 15, line 1, the word "therewith" should be --therewithin--.

Signed and Sealed this

Twenty-fifth Day of May, 1993

Attest:

Michael K. Kirk

MICHAEL K. KIRK

*Attesting Officer*

*Acting Commissioner of Patents and Trademarks*